United States Patent [19]

Fohrman

[11] Patent Number: 4,960,246
[45] Date of Patent: Oct. 2, 1990

[54] GRINDER CLOSURE FOR A CONTAINER

[76] Inventor: Scott R. Fohrman, 1123 Linden, Wilmette, Ill. 60091

[21] Appl. No.: 423,962

[22] Filed: Oct. 19, 1989

[51] Int. Cl.$^5$ .............................................. A47J 42/04
[52] U.S. Cl. ................................................ 241/169.1
[58] Field of Search ...................... 241/169.1, 168, 258, 241/257 R, 259

[56] References Cited
U.S. PATENT DOCUMENTS
3,371,874  3/1968  Reeves et al. .................... 241/169.1

FOREIGN PATENT DOCUMENTS
2851198  6/1979  Fed. Rep. of Germany ... 241/169.1

Primary Examiner—Mark Rosenbaum
Attorney, Agent, or Firm—Welsh & Katz, Ltd.

[57] ABSTRACT

A grinder closure for attachment to the upper end of a container, the closure including a tubular base to which an annular outer grinding member with a grinding surface is coaxially secured, an inner grinding member with a grinding surface and being configured to axially rotate within an area defined by the outer grinding member, a shell member to which the inner grinding member is coaxially secured, the shell configured for axial journalled rotation relative to the base, and a retainer device for holding the shell against the base.

22 Claims, 2 Drawing Sheets

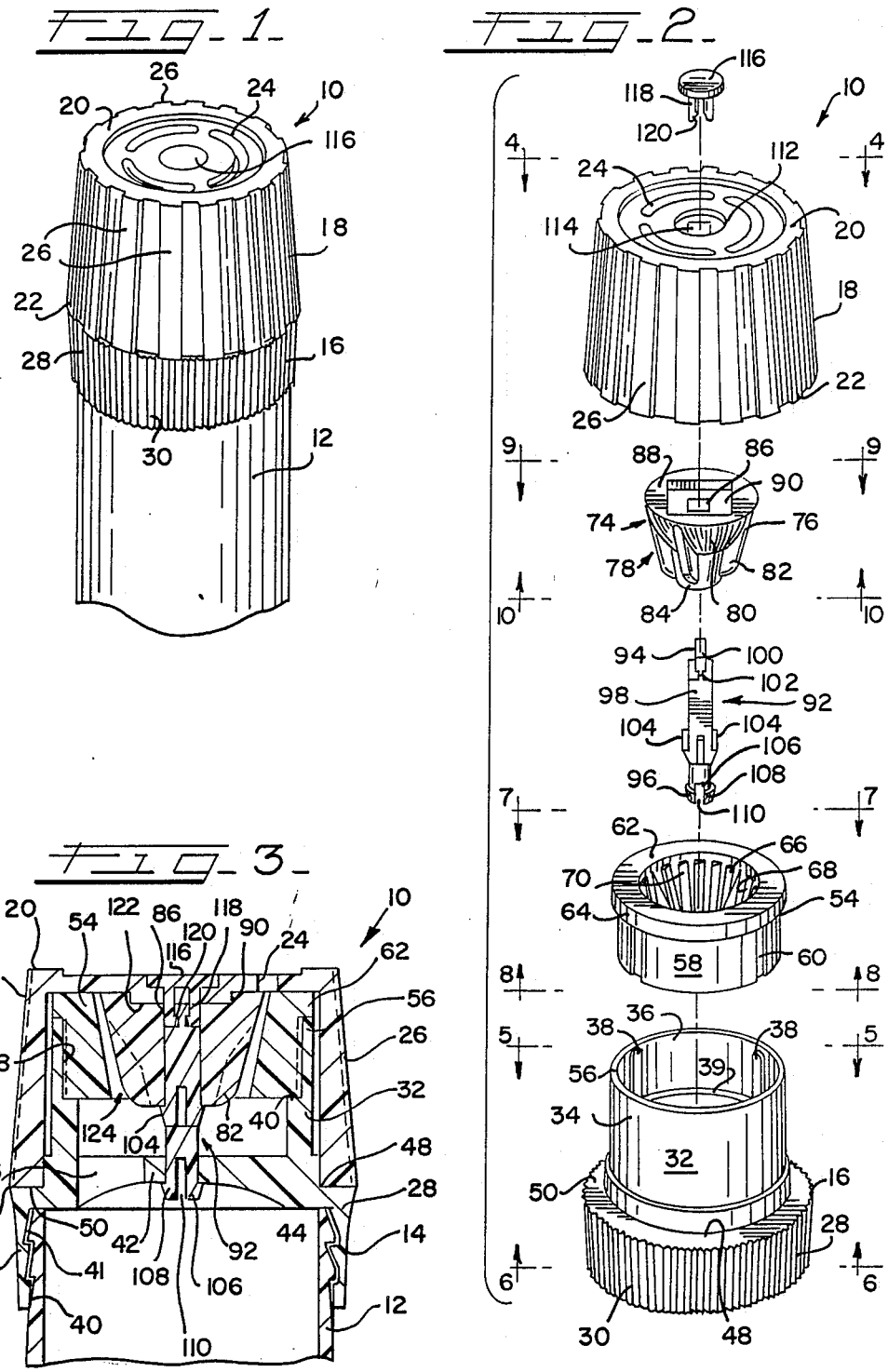

GRINDER CLOSURE FOR A CONTAINER

BACKGROUND OF THE INVENTION

The present invention relates to closures for containers and specifically provides a closure for a container which is designed to grind the contents of the container, such as spices, for dispersal out through the upper end of the closure.

Certain spices, such as peppercorns, are often provided in a naturally granular or unground state to preserve their flavor-enhancing characteristics. Just prior to use, the spices are ground and then sprinkled or sifted upon the desired food item to be seasoned. Conventional spice grinding devices are fabricated of metal which becomes corroded over time through exposure to compounds in the spices. Once conventional grinding closures become corroded, they must be disposed of.

Conventional grinder closures must address the problem of holding the spice granule within the closure assembly while it is being ground. The grinding process normally occurs through axial rotation of one portion of the closure relative to another. At the same time, at least a portion of the assembly must be secured to the end of the closure. Prior attempts to solve these problems have involved the use of overly complex and expensive mechanisms, portions of which often must be integral with the container. In addition, prior art grinder closures have fragile and readily corrodible components. These design considerations often are in conflict with the need for low manufacturing and assembly costs for this type of closure, which is normally disposed of when the contents of the container are used up.

Thus, there is a need for a grinder closure for a container which is: corrosion resistant or corrosion free, independent of the spice container, unbreakable in normal household use, and inexpensive to produce and to assemble.

SUMMARY OF THE INVENTION

Accordingly, a grinder closure for attachment to a container is provided, including a tubular base having an annular skirt and a vertically projecting barrel portion with an open upper end, an outer grinding ring having a grinding surface and adapted for insertion into the upper open end of the barrel portion, the grinding ring being secured against axial rotation relative to the base, an inner grinding member configured to rotate axially within an area defined by the outer grinding ring, an outer tubular shell configured to be journalled about the vertically projecting barrel portion, and a fastener such as a connecting pin which secures the inner grinding member to the shell and which retains the shell against the base for axial rotation of the shell relative to the base.

The closure is assembled independently of the container and is placed upon the neck thereof, so that the base is secured to the container neck. A preferred container is a spice bottle containing peppercorns or similar spices. When the bottle is inverted and the shell of the closure is rotated relative to the base, peppercorns caught between the inner and outer grinding surfaces will be ground, with the ground particles then falling through slits in the upper end of the shell.

BRIEF DESCRIPTION OF THE DRAWINGS

FIG. 1 is a front perspective elevational view of the closure of the invention shown mounted upon a bottle;

FIG. 2 is an exploded front perspective elevational view of the closure as depicted in FIG. 1;

FIG. 3 is a vertical sectional view of FIG. 1;

DESCRIPTION OF THE PREFERRED EMBODIMENT

Figure 4:
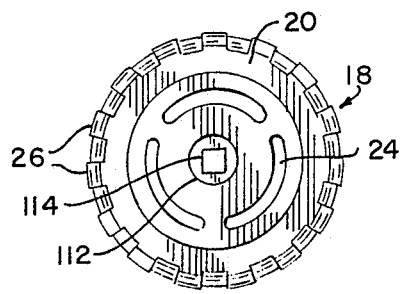
FIG. 4 is a plan view taken along the line 4—4 of FIG. 2 and in the direction generally indicated.

Referring now to FIGS. 1-4, the grinder closure of the invention, generally designated 10, is shown secured to the upper end of a container 12. The container 12 is preferably a bottle having a threaded upper portion or neck 14 (best seen in FIG. 3). The material and shape of the container 12 are not critical to the present invention. The closure 10 includes a base portion 16 and an outer shell 18, both the base portion and the outer shell being of generally tubular construction. The shell 18 has a generally planar upper end 20 and an open lower end 22. The upper end 20 is provided with a plurality of elongated arcuate slits or openings 24 through which the ground spice material is sifted. The exact size and shape of the slits 24 is not critical to the present invention as long as comminuted spices are allowed to pass therethrough. The outer portion of the shell 18 may be provided with a plurality of generally parallel spaced vertical gripping ribs 26. The base 16 is provided with a depending skirt portion 28. The base skirt portion 28 is preferably provided with a series of gripping ridges 30.

Referring now to FIGS. 2 and 3, the grinder closure 10 is shown in greater detail. The base 16 includes a vertically projecting tubular barrel portion 32 having an exterior surface 34 and an interior surface 36. The interior surface 36 is also provided with a plurality of spaced ribs or fillets 38. The interior surface 36 also includes an inwardly projecting annular shoulder 39 disposed at a lower end of the fillets 38. The inner surface 40 of the skirt 28 is provided with a helical thread 41.

Figure 5:
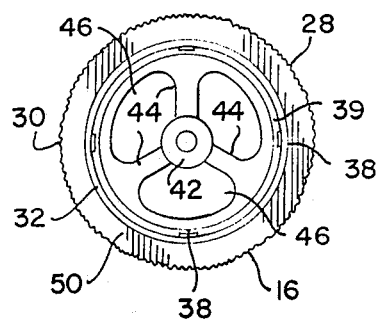
FIG. 5 is a plan view taken along the line 5—5 of FIG. 2 and in the direction generally indicated.
Figure 6:
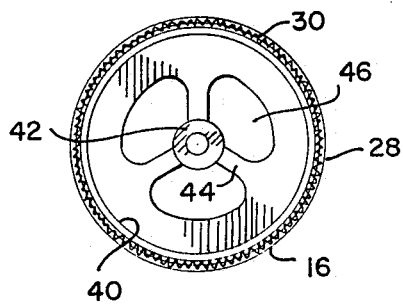
FIG. 6 is a bottom view taken along the line 6—6 of FIG. 2 and in the direction generally indicated.

Referring now to FIGS. 2, 5 and 6, it will be evident that the base has an eyelet 42 which is axially located within the barrel portion 3 and is secured therein by means of a plurality of support legs 44. In the preferred embodiment, three support legs 44 are depicted, although the number of legs may depend upon the application. The legs 44 are preferably disposed so as to define at least one relatively large opening 46 through which the spice granules may pass to be ground. The barrel portion 32 is of a lesser diameter than is the skirt 28 so that the base 48 of the portion 32 at its junction with the skirt 28 forms an annular shoulder 50. Once the closure 10 is assembled, the shoulder 50 provides a seat for the lower end 22 of the shell 18.

Figure 7:
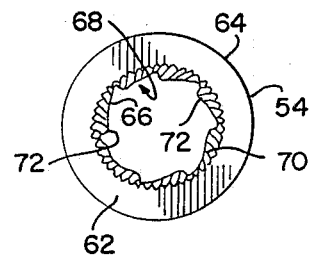
FIG. 7 is a plan view taken along the line 7—7 of FIG. 2 and in the direction generally indicated.
Figure 8:
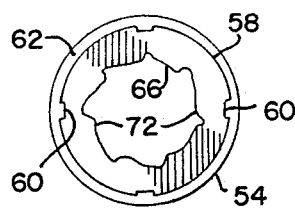
FIG. 8 is a bottom view taken along the line 8—8 of FIG. 2 and in the direction generally indicated.

Referring now to FIGS. 2, 7 and 8, an annular grinder ring 54 is provided and is configured to be inserted into the upper end 56 of the barrel portion 32. The ring 54 is provided on its outer periphery 58 with a plurality of vertically extending elongate grooves 60. The exact number and position of the grooves 60 is designed to place them in mating sliding engagement with the ribs 38 on the interior 36 of the barrel portion 32. Thus, the periphery 58 of the ring 54 will be in contact with the interior surface 36 of the portion 32. A laterally outwardly projecting flange portion 62 is located at the upper end 64 of the ring 54. The upper end 56 of the barrel portion 32 provides a seat for the flange 62 of the ring 54.

The ring 54 has an inner surface 66 which is provided with a plurality of grinding teeth 68. The teeth 68 are somewhat curved or spiral in configuration and further include a first plurality of smaller teeth 70 and a lesser plurality of larger teeth 72. The spiral nature of the teeth 70 and 72 creates a generally negative frustoconical shape in the inner surface 66 (best seen in FIG. 3).

Figures 9, 10:
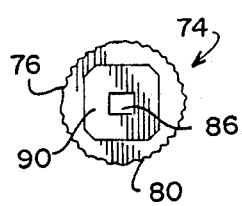
FIG. 9 is a plan view taken along the line 9—9 of FIG. 2 and in the direction generally indicated.
FIG. 10 is a bottom view taken along the line 10—10 of FIG. 2 and in the direction generally indicated.

Referring now to FIGS. 2, 9 and 10, an inner grinding member is shown and is generally indicated by reference number 74. The member 74 is generally frustoconical in shape and is configured to be axially rotatable within the area defined by the inner grinding surface 66 of the ring 54. The member 74 includes an upper end portion 76 which is generally bowl-shaped and is provided with a plurality of teeth 78 along its outer periphery. The teeth 78 include a first plurality of relatively smaller teeth 80 and a second plurality of relatively larger teeth 82. The larger teeth 82 preferably depend vertically to contact a lower hub portion 84 which is of relatively narrower diameter than is the bowl portion 76. The inner grinding member 74 is provided with an axial throughbore 86 which, in the preferred embodiment, is rectangular in configuration; however, other polygonal configurations such as hexagonal, etc., are contemplated. An upper surface 88 of the bowl-shaped portion 76 is generally planar and is provided with a rectangular or otherwise polygonal recess 90. In the preferred embodiment, the inner grinding member 74 is a one-piece formation.

Referring now to FIGS. 2 and 3, a connecting pin is depicted, and is generally indicated by reference numeral 92. The pin 92 has an upper end 94, a lower end 96 and a central or shank portion 98. The upper end 94 is provided with a transverse tab 100 which is joined to the central portion 98 by a narrowed neck 102. The tab 100 is generally rectangular in cross-section and is provided with a length which is approximately co-dimensional with the cross-sectional length of the central portion 98. The central portion 98 is rectangular in cross-section and is further provided with a pair of barb-like locking formations 104, one of which being located on each of two opposing sides of the pin 92. The barb formations 104 are generally tapered at their lower ends.

The barb formations 104 define at their lower ends the beginning of the lower end portion 96 of the pin 92. The lower end portion 96 is generally cylindrical in cross-section, as opposed to the rectangular cross-sectional central portion 98 of the pin 92. The lower portion 96 is provided with a pair of legs 106, each of which has a tapered barb-like locking portion 108. A space 110 is defined by the inner margins of the legs 106 and provides the legs with a certain resiliency and compressibility.

Referring now to FIGS. 2, 3 and 4, the shell 18 is provided at its upper end 20 with a centrally located recess 112 which has a preferably square but otherwise polygonal throughbore 114. A locking button 116 is provided with a generally circular shape which will be inserted into the recess 112. The button 116 has a pair of depending legs 118 which are configured to be fairly planar and slab-like in configuration, and are each provided at a lower inside margin with a barb-like locking formation 120. The legs 118 are configured to be inserted into the polygonal throughbore 114 at the upper end 20 of the shell 18. The legs 118 are also configured to matingly engage the transverse tab 100 to form a torque resisting locking member which secures the inner grinding member 74 to the shell 18 as a unit (best seen in FIG. 3).

Assembly of the closure 10 of the invention is effected by slipping the upper end and central portions 94, 98 of the pin 92 up through the throughbore 114 of the shell 18 until the locking formations 104 abut a depending boss 122 which is situated on the underside of the upper end 20 (best seen in FIG. 3). The boss 122 is preferably square or polygonal in shape so as to matingly engage the recess 90 in the inner grinding member 74. Next, the button 116 is inserted over the tab 100 of the pin 92 so that the locking formations 120 engage the neck 102 of the pin. The pin 92 and the button 116 are then locked together. The button 116 is lowered into the recess 112 so that it is coaxial and flush with the upper end 20 of the shell 18. The inner grinding member 74 is then slipped over the pin 92 so that the pin projects through the rectangular throughbore 86. Next, the pin 92 is driven home through the grinding member 74 until it snaps into place, with the locking formations 104 of the pin 92 lockingly engaging the lower end of the hub 84. To prevent the pin 92 and the grinding member 74 from rotating axially relative to the shell 18, the upper recess 90 of the grinding member 74 matingly engages the depending boss 122 of the shell 18. At this point, the shell 18 and the inner grinding member 74 form an integral unit.

Following the above-discussed assembly of the shell 18, the grinder ring 54 is then dropped into the vertically projecting barrel 32 so that the slots or grooves 60 engage the ribs 38. The flange portion 62 seats upon the upper portion 56 of the barrel 32 and the lower end of the ring 54 contacts the shoulder 39. Thus, the grinder ring 54 is held against axial rotation relative to the barrel 32 or to the base 16.

Lastly, the shell 18, with its attached inner grinding member 74 and the pin 92, is slipped over the exterior surface 34 of the barrel 32 and is compressed under force until the legs 106 matingly engage the eyelet 42. The locking formations 108 then engage the eyelet 42 and thus retain the pin 92 within the base 16, and retain the shell 18 against the base 16. In this manner the shell 18, the inner grinding member 74 and the pin 92 are axially rotatable relative to the barrel 32 and the grinder ring 54. The pin 92 plays a dual role, both securing the inner grinding member 74 to the shell 18 and rotatably securing the shell assembly 18, 74, 116 to the base assembly 16, 54.

In operation, the assembled closure 10 is threaded upon or otherwise attached to the neck portion 14 of the spice container 12. When spices are to be ground, the container 12 is inverted, thus causing the spice granules to fall through the spaces 46 and into a grinding chamber 124 (best seen in FIG. 3). The user then grasps the ridges 30 on the base 16 in one hand and the ribs 26 on the shell 18 with the other, and rotates the shell axially relative to the base 16. This causes a grinding action between the teeth 80 and 82 of the inner grinding member 74 against the spiral teeth 70 and 72 of the grinder ring 54. The spiral configuration of the teeth 70 and 72 tends to "auger" the spice granules into a position between the inner grinding member 74 and the outer grinder ring 54. The spices are then ground to fine particulate consistency which passes through the slits 24 in the upper end 20 of the shell 18.

All of the components of the closure 10, i.e., the base 16, the shell 18, the grinder ring 54, the inner grinding member 74, the pin 92 and the button 116 are preferably fabricated of polymeric materials, with the base, the shell and the button preferably being made of ABS, and the remaining parts being made of DELRIN polymer. Thus, the closure of the invention is not subject to corrosion through the chemical reaction with oils or other compounds in the spices. Furthermore, the closure may be washed and used repeatedly.

Thus, the closure of the invention provides a corrosion resistant, effective and simple yet inexpensive grinder mechanism for use on a variety of spice containers.

While a particular embodiment of the grinder closure of the invention has been shown and described, it will be appreciated by those skilled in the art that changes and modifications may be made thereto without departing from the invention in its broader aspects and as set forth in the following claims.

What is claimed is:

1. A grinder closure for a container, comprising:
  a base with an open lower end and a vertically projecting tubular barrel portion having an open upper end, and interior and exterior surfaces, said base being configured for attachment to the container;
  an outer grinding member having an annular grinding surface and configured to be secured against axial rotation within said barrel portion;
  an inner grinding member provided with a grinding surface and configured to rotate axially within an area defined by said annular grinding surface;
  an outer tubular shell having an open lower end and an upper end with at least one opening, said shell being configured to be journalled about said barrel portion;
  keeper means for securing said inner grinding member to said shell; and
  retaining means for securing said shell to said base so that said shell may rotate axially relative to said base.

2. The closure as defined in claim 1 wherein said base further includes a depending skirt having an interior surface which is helically threaded for replaceable attachment to the container.

3. The closure as defined in claim 1 wherein said base is tubular and includes mounting means axially disposed within said base.

4. The closure as defined in claim 3 wherein said mounting means is an eyelet attached to an interior surface of said base by at least one leg member.

5. The closure as defined in claim 1 further including a plurality of elongate, vertically extending ribs located on said interior surface of said barrel portion.

6. The closure as defined in claim 5 wherein said outer grinding member is a ring having a like plurality of vertical slots on an outer edge thereof for engaging said ribs on said barrel portion to retain said ring against axial rotation relative to said base.

7. The closure as defined in claim 6 wherein said ring has a laterally outwardly projecting lip which abuts an upper end of said tubular portion.

8. The closure as defined in claim 6 wherein said grinding surface of said ring defines a negative conical recess which narrows toward said lower end of said base.

9. The closure as defined in claim 8 wherein said grinding surface of said ring is further provided with a plurality of teeth.

10. The closure as defined in claim 1 wherein said inner grinding member is generally frustoconical in shape and has a narrowed lower end.

11. The closure as defined in claim 10 wherein said grinding surface of said inner grinding member has a plurality of teeth.

12. The closure as defined in claim 11 wherein said teeth include a first plurality of larger and longer teeth, and a second plurality of relatively smaller and shorter teeth.

13. The closure as defined in claim 10 wherein said inner grinding member has an axial bore which is polygonal in shape.

14. The closure as defined in claim 1 wherein said keeper means is a pin having a polygonal shank portion and fastening means at upper and lower ends thereof.

15. The closure as defined in claim 14 wherein said fastening means at said upper end is a transverse tab with a narrowed neck portion.

16. The closure as defined in claim 15 wherein said keeper means further includes a fastening button having two legs for engagement with said tab, said legs having formations designed to engage said neck, said button configured to be coaxially located on said upper end of said shell, with said legs extending through said shell to engage said tab.

17. The closure as defined in claim 16 wherein said retaining means includes a pair of depending legs located on said pin at an opposite end to said transverse tab, and mounting means axially disposed in the interior of said base, said legs lockingly engaging said mounting means.

18. The closure as defined in claim 10 wherein said inner grinding member has a polygonal recess at an upper end thereof, and said outer shell has a polygonal boss at an underside of an upper end thereof, said recess being configured to accommodate said boss to secure said grinding member against axial rotation relative to said shell.

19. A grinder closure for a container having a threaded neck, said closure comprising:
  a tubular base portion with an annular skirt at a lower end and an upwardly projecting barrel portion, said base being configured for attachment to the container;
  mounting means axially disposed within said base;
  an outer grinder ring with a grinding surface disposed on an inner surface thereof, said ring configured for insertion into an upper end of said barrel portion so as to be secured against axial rotation;
  an inner grinding member with a grinding surface, an axial polygonal bore, and a polygonal recess at an upper end thereof;
  an outer tubular shell having an upper end with at least one opening and being journalled about said barrel portion for axial rotation relative thereto; and means for securing said shell and said inner grinding member to said mounting means in said base for axial rotation of said shell relative to said base so that said inner grinding surface rotates axially relative to said outer grinding surface.

20. The closure as defined in claim 19 wherein a grinding chamber is defined between said inner and outer grinding surfaces.

21. The closure as defined in claim 19 wherein said securing means includes a pin having upper and lower ends.

22. The closure as defined in claim 21 wherein said upper end of said pin is secured to said shell, and said lower end is retained by said mounting means for axial rotation relative to said base.

* * * * *